United States Patent
Tian et al.

(10) Patent No.: US 8,964,056 B2
(45) Date of Patent: Feb. 24, 2015

(54) ENCODER-SUPERVISED IMAGING FOR VIDEO CAMERAS

(75) Inventors: Dihong Tian, San Jose, CA (US); Wing-Kuen Chung, Los Altos, CA (US); Qing Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 744 days.

(21) Appl. No.: 13/174,432

(22) Filed: Jun. 30, 2011

(65) Prior Publication Data

US 2013/0002898 A1   Jan. 3, 2013

(51) Int. Cl.
*H04N 5/228* (2006.01)
*H04N 9/73* (2006.01)
*H04N 5/225* (2006.01)
*H04N 5/232* (2006.01)

(52) U.S. Cl.
CPC ............... *H04N 5/232* (2013.01); *H04N 5/225* (2013.01); *H04N 5/228* (2013.01)
USPC .................... 348/222.1; 348/223.1; 348/207.1

(58) Field of Classification Search
CPC .................................................. H04N 5/2256
USPC ............. 348/222.1, 223.1, 255, 229.1, 220.1, 348/207.1, 221.1, 362
See application file for complete search history.

(56) References Cited

U.S. PATENT DOCUMENTS

| | | | |
|---|---|---|---|
| 6,680,745 B2 * | 1/2004 | Center et al. | 348/14.16 |
| 7,552,227 B2 | 6/2009 | Wang | |
| 7,733,380 B1 * | 6/2010 | Cote et al. | 348/222.1 |
| 8,837,178 B2 * | 9/2014 | Fornage | 363/56.02 |
| 2002/0113862 A1 * | 8/2002 | Center et al. | 348/14.08 |
| 2004/0066854 A1 | 4/2004 | Hannuksela | |
| 2011/0075724 A1 | 3/2011 | Reznik et al. | |
| 2011/0110420 A1 * | 5/2011 | Liang et al. | 375/240.03 |

OTHER PUBLICATIONS

International Search Report on PCT Application PCT/US2012/042765 mailed Sep. 19, 2012.
Thomas Wiegand et al: "Overview of the H.264/AVC Video Coding Standard", IEEE Transactions on Circuits and Systems for Video Technology, vol. 13 No. 7, Jul. 2003, pp. 560-576.
Gary J. Sullivan et al: "Video Compression—From Concepts to the H.264/AVC Standard", Proceedings of the IEEE, vol. 93 No. 1, Jan. 2005, pp. 18-31.
Pixim, Inc.: "Digital Pixel System Technology White Paper", Platform Overview, Rev. 3.0, Jun. 2, 2008, Retrieved Sep. 30, 2011 at http://www.pixim.com/assets/files/product_and_tech/Digital_Pixel_System_Technology_White_Paper_June_2_08.pdf
Miska M. Hannuksela et al: "Isolated Regions in Video Coding", IEEE Transactions on Multimedia, vol. 6 No. 2, Apr. 2004, pp. 259-267.

* cited by examiner

*Primary Examiner* — Ahmed A Berhan (57) ABSTRACT

A controller controls a camera that produces a sequence of images and that has output coupled to a video encoder. The camera has an operating condition including a field of view and lighting, and one or more imaging parameters. The video encoder encodes images from the camera into codewords. The controller receives one or more encoding properties from the video encoder, and causes adjusting one or more of the imaging parameters based on at least one of the received encoding properties, such that the camera produces additional images of the sequence of images for the video encoder using the adjusted one or more imaging parameters.

22 Claims, 7 Drawing Sheets

ENCODER-SUPERVISED IMAGING FOR VIDEO CAMERAS

FIELD OF THE DISCLOSURE

The present disclosure relates generally to video processing, and in particular to controlling imaging of a camera using properties of a video encoder that encodes a sequence of images produced by the camera.

BACKGROUND

A digital video camera, hereafter referred to simply as a camera, carries out imaging to produce a video signal in the form of a time sequence of images, each image represented by a two dimensional set of picture elements, called pixels. A camera includes a photosensitive medium, e.g., an image sensor, optics to focus a light image on to the photosensitive medium, and circuitry to convert the light image to the digital signals corresponding to the time sequence of images. A camera accepts one or more imaging parameters that control the imaging. Two commonly used imaging parameters are exposure and color balance; the latter sometimes called white balance. One manner of controlling exposure controls the total amount of light that can reach the photosensitive medium of the camera. Color balance enables adjustment of the relative intensities of primary colors, e.g., red, green, and blue, or RGB such that specific colors—particularly neutral colors, e.g. white, are rendered correctly in produced images.

A camera may have one or more elements configured to (i) measure one or more characteristics of the lighting within its field of view and (ii) adjust, e.g., automatically adjust imaging parameters according to the measured characteristics. For example, a camera may have automatic exposure control to adjust such parameters as signal integration times of the camera's one or more image sensors according to the exposure to ensure the signal is within a dynamic range. Some color cameras, e.g., color cameras that have multiple sensors, e.g., red-green-blue ("RGB") sensors to produce multiple signal channels, one per color, include automatic white balance control to adjust relative gains used in each color channel according to a measure of the hue of lighting, e.g., the color temperature of lighting as measured by one or more sensors included in the camera. Many methods are known for performing automatic exposure and automatic white balance functions. Automatic exposure control, automatic white balance control, and automatic focus are sometimes referred to as 3A.

In many applications, e.g., video conferencing and video surveillance, the output of a camera may be coupled to a video encoder that compresses the images under a constant-bit-rate ("CBR") limitation, in order to transmit the video data over a network connection. For example, a camera producing images with a spatial resolution of 1920×1080 pixels and at a rate of 30 images per second may be connected to a video encoder that encodes the sequence of images under a constant bit-rate of 4 Mega bits per second, or 4 Mbps.

Compression of images by a video encoder is commonly based on prediction. Data of a currently to-be-encoded image or portion thereof is predicted with reference to one or more previously processed images or portions thereof. The differences between the actual and predicted data, called residuals, are then encoded. In general, the larger differences between the currently to-be-encoded image and the reference images, the more likely a larger number of bits to be consumed to encode the image. Under a constant bit-rate, this also means that a lower-quality image is more likely to be generated by the video encoder, when the encoded image is decoded and displayed.

Existing methods of adjusting imaging parameters of a camera, such as those automatic exposure and automatic white balance functions, are based on detection of a change of lighting. None of the methods, however, takes into account the impact such adjustments have on a video encoder when the output of the camera is coupled to the encoder. More specifically, adjusting imaging parameters may result in a disruptive change of pixel values in the subsequent images produced by the camera, and consequently cause degradation of image quality to the encoder under a constrained bit-rate. Such degradation of one image may be extended to more subsequent images due to the predictive nature of compression.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

DESCRIPTION OF EXAMPLE EMBODIMENTS

Overview

Described herein are a method, an apparatus, and logic encoded in one or more computer-readable hardware storage media to carry out a method. The method includes causing spatial-temporal adjustment of a camera's one or more imaging parameters in a manner that takes into account encoding properties of a video encoder, to which the output of the camera is coupled, such that images produced by the camera with the adjusted one or more imaging parameters are retained at relatively higher quality after being encoded by the video encoder.

Particular embodiments include a method comprising receiving by a controller one or more encoding properties from a video encoder; and causing by the controller of adjusting of at least one imaging parameter of a camera that produces a sequence of images, such that the camera produces additional images of a sequence of images for the video encoder using the adjusted at least one imaging parameter. The causing of the adjusting is based on at least one of the received encoding properties. In particular embodiments of the method, the controller is in the camera, or is coupled to an output of the camera. The camera has an operating condition that includes, a field of view, lighting, and one or more imaging parameters, including the adjusted at least one imaging parameter. The video encoder is to encode the sequence of images produced by the camera into codewords by performing prediction-based compression.

In some embodiments, the method further includes receiving by the controller of an indication of the operating condition of the camera, such that the adjusting of one or more of the imaging parameters is also based on the indication of the operating condition.

In one specific example, the indication of the operating condition of the camera may be an indication of a change of the lighting in the camera's field of view. Such change may be, for example, a change of the intensity of the lighting, or a change of the hue of the lighting. The controller may itself detect the change of the lighting, or it may receive the indication of the change from, e.g., the camera.

In another example, the indication of the operation condition of the camera may be an indication of a change of one or more imaging parameters. The change of one or more imaging parameters may be initiated by the camera, upon detection of a change of the lighting.

In both the above examples, the imaging parameters to be adjusted may be one or more of an exposure parameter, in correspondence to a change of the intensity of the lighting, and a color balance parameter, in correspondence to a change of the hue of the lighting.

Particular embodiments also include an apparatus comprising a controller coupled to a video encoder and configured to control one or more imaging parameters of a camera that produces a sequence of images. The controller is configured to receive one or more encoding properties from the video encoder, and cause adjusting of at lease one imaging parameter, such that the camera produces additional images for the video encoder using the adjusted one or more imaging parameters. The causing of the adjusting based on at least one of the received encoding properties. The camera has an operating condition that includes a field of view, lighting, and one or more imaging parameters that includes the adjusted at least one imaging parameter. The video encoder is configured to encode the images from the camera into codewords by performing prediction-based compression.

Particular embodiments also include an apparatus comprising: a camera to produce a sequence of images and having an output. The camera has an operating condition that includes one or more imaging parameters, a field of view and lighting. The apparatus further includes a controller. The controller is in the camera or is coupled to the camera, and is configured to control one or more of the imaging parameters. The apparatus further includes a video encoder coupled to the output of the camera and operative to encode the images from the camera into codewords by performing prediction-based compression. The controller is configured to receive one or more encoding properties from the video encoder, and to cause adjusting of the one or more of the imaging parameters based on at least one of the received encoding properties, such that the camera produces additional images for the video encoder using the adjusted one or more imaging parameters.

In some embodiments of an apparatus, the controller is configured also to receive an indication of the operating condition of the camera, and to cause adjusting of one or more of the imaging parameters based on the indication of the operating condition.

Particular embodiments include a computer-readable hardware storage medium storing executable instructions that when executed by one or more processors of a processing system implement a method comprising operating a controller to control one or more imaging parameters of a camera. The camera is configured to produce a sequence of images and has an output coupled to a video encoder. The camera may be in the controller or coupled to the controller. The camera has an operating condition that includes a field of view, lighting, and at least the one or more imaging parameters. The video encoder is configured to encode the images from the camera into codewords by performing prediction-based compression. The method includes the controller receiving one or more encoding properties from the video encoder, and the controller causing adjusting one or more of the imaging parameters based on at least one of the received encoding properties, such that the camera produces additional video images for the video encoder using the adjusted one or more imaging parameters.

In some specific examples of the method, apparatus, and storage medium, the indication of the operating condition of the camera may be an indication of a change of the lighting in the camera's field of view. Such change may be, for example, a change of the intensity of the lighting, or a change of the hue of the lighting. The controller may itself detect the change of the lighting, or it may receive the indication of the change from, e.g., the camera.

In other examples of the method, apparatus, and storage medium, the indication of the operation condition of the camera may be an indication of a change of one or more imaging parameters. The change of one or more imaging parameters may be initiated by the camera, upon detection of a change of the lighting.

In the above examples, the imaging parameters to be adjusted may be one or more of an exposure parameter, in correspondence to a change of the intensity of the lighting, and a color balance parameter, in correspondence to a change of the hue of the lighting.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Example Embodiments

The apparatus and method embodiments described herein are for causing spatial-temporal adjustment of a camera's imaging parameters, such as exposure and color balance parameters, in a favorable fashion that enables succeeding video encoding functions to retain consistent, higher quality output than if no such adjustment is performed. Method and apparatus and computer-readable medium embodiments may be useful, for example, in arrangements in which the video encoding is CBR encoding.

Figure 1:
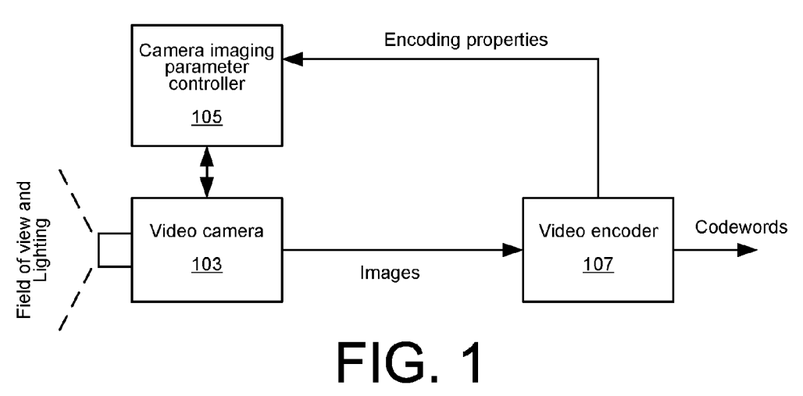
FIG. 1 shows a block diagram of one embodiment of an encoder-supervised imaging apparatus.

FIG. 1 shows one embodiment of an imaging apparatus controlled according to encoding properties from an encoder, such an apparatus called an encoder-supervised apparatus herein. The apparatus includes a camera 103, a camera imaging parameter controller 105, and a video encoder 107, such elements coupled as shown. In some embodiments, an additional element may be included, e.g., an image analysis element may be included between the camera 103's output and the input to the encoder 107. Note that the controller or parts thereof may be in the camera, in the encoder or be a separate unit, and the whole apparatus may be included in a so called network camera that has a camera and encoder combination together with a network interface. The camera 103 has an operating condition that includes one or more imaging parameters, a field of view and lighting. The imaging parameters control the imaging. The camera 103 produces a sequence of images, and has the output coupled to the video encoder 107. The encoder 107 encodes images from the camera 103 into a series of codewords by performing prediction-based compression. In one example, e.g., video conferencing, the codewords may be formed into a bitstream and transmitted through via a network—i.e., through a channel that includes a network link—to a video decoder, which decodes the codewords to reconstruct a sequence of images that resembled the original sequence of images.

In one embodiment, the encoder encodes according to the ITU-T H.264 standard (also called "H.264/AVC") according to which each image of the sequence of images is partitioned into a set of blocks of one or more sizes. An image may be an intra-coded image (sometimes called an "I-picture," "I-frame," or "I-image") that is encoded independently from other images, and that can be used as a reference image for predicting other images, or an inter-coded image. An inter-coded image is an image encoded with at least part of the image being predicted from one or more previously processed images or parts thereof. Inter-coded images are also called P-frames and B-frames (depending on the type of prediction). As an example, an inter-coded image is an image whose blocks are predicted from blocks of one or more images, e.g., intra-coded images used as reference images for prediction. The prediction includes motion-compensation. Alternate embodiments use other block-based compression methods using prediction, e.g., motion compensated prediction, and such other methods may conform to a standard, or may be non-conforming, e.g., proprietary methods.

The controller 105 is to control at least one of the one or more imaging parameters of the camera. The controller 105 receives encoding properties from the encoder 107. The encoding properties are parameters generated by the encoder 107 to represent one or more characteristics and states of the encoding operations carried out by the encoder 107. Encoding properties that the controller 105 receives from the encoder 107 include, for the example of a H.264 encoder, one or more of what type of video encoding the encoder does (inter-frame, block-based, etc), what block transform the encoder is using (4×4, 8×8, etc), the group of pictures ("GOP") size and the frame index, how an image is divided into slices, the state of the rate control, and the luminance/color statistics of images in a long-term reference buffer that is included in a H.264 encoder. In general, the encoding properties are encoding properties that will enable the camera to perform adjustment, e.g., pixel in an encoder-friendly fashion and toward a higher rate distortion performance of the encoder. Several examples of encoding properties are described in more detail below in this description.

The controller 105 may also receive an indication of the operating condition of the camera 103 in order to control at least one of the one or more imaging parameters of the camera 103. In one specific example, the indication of the operating condition includes an indication of a change of the lighting in the camera 103's field of view, which may be a change of the intensity of the lighting, or a change in white balance, e.g., a change of the hue of the lighting, e.g., as indicated by a measure of the color temperature of the lighting. The controller 105 may receive the indication of the change of the lighting from the camera 103. Alternatively, the controller 105 may itself detect the change of the lighting, using the same light metering device or devices used in typical video cameras. Such devices are commonly known to those skilled in the art.

In another example, the indication of the operation condition of the camera 103 may include an indication of a change of one or more imaging parameters. The change of one or more imaging parameters may be initiated by the camera 103, upon detection of a change of the lighting.

In both the above examples, the one or more imaging parameters to be adjusted may include one or more of an exposure parameter, adjusted in response to a detected change of the intensity of the lighting, and a color balance parameter, adjusted in response to a detected change of the hue of the lighting, e.g., the color temperature of the lighting. Other one or more imaging parameters also may be adjusted.

Output of the controller 105 is directed to the camera 103 to cause adjusting of one or more imaging parameters of the camera 103, such that the camera 103 produces a sequence of (additional) images with the adjusted imaging parameters, such that the sequence of additional images are subsequently encoded by the encoder 107. The adjustment continues so that the encoding is of images obtained using one or more imaging parameters including at least one adjusted according to the output of the controller. The output of the controller in one embodiment includes actual values of the to-be-adjusted one or more imaging parameters, and in another embodiment, instructions on how those one or more imaging parameters are to be adjusted, and in yet another embodiment, one or more actual values of one or more one or more imaging parameters and instructions for one or more other one or more imaging parameters.

Figure 2:
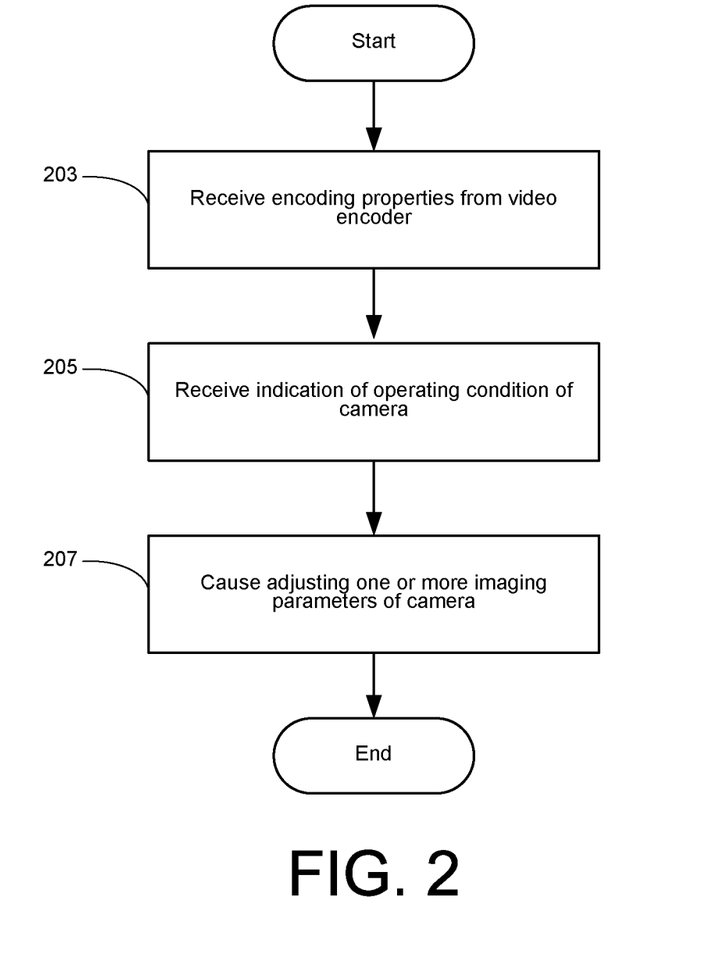
FIG. 2 shows a flowchart of one embodiment of an encoder-supervised imaging method.

FIG. 2 shows a flowchart of one embodiment of a method called an encoder-supervised imaging method herein. The method includes operating a controller to carry out a set of controller-implemented steps. In 203, the controller receives encoding properties from the video encoder 107. In 205, the controller receives an indication of the operating condition of the camera. In 207, the controller determines an output and causes adjusting at least one of the one or more imaging parameters of the camera. The images subsequently are generated with the new one or more imaging parameters. The method continues with repeating the steps so that the images being encoded are obtained with one or more imaging parameters determined according to at least the encoding properties.

The method presented in FIG. 2 may be better understood with following example implementations, respectively shown in FIGS. 3A and 3B, 4A and 4B, and 5A and 5B, each in regard to one example encoding property.

Figure 3A:
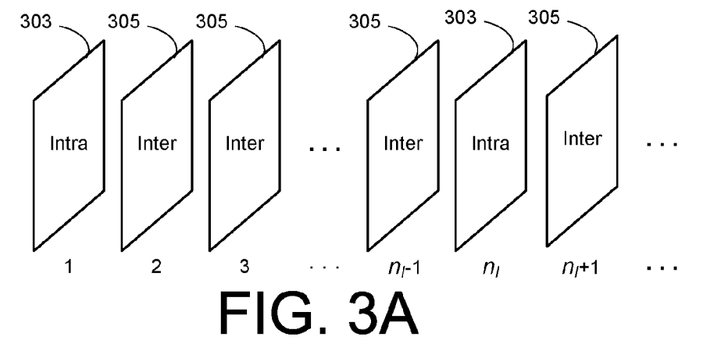
FIG. 3A shows one example encoding property used in one embodiment of a method of controlling adjustment of one or more imaging parameters of a camera.
Figure 3B:
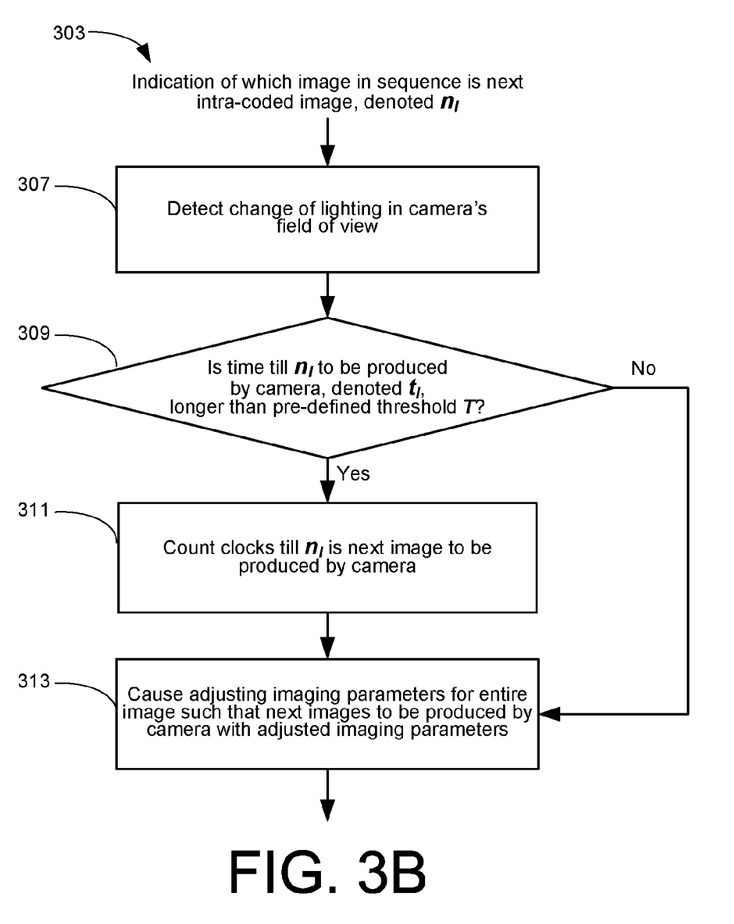
FIG. 3B shows a simplified flowchart of one embodiment of a method os controlling adjustment of one or more imaging parameters of a camera using the example property shown in FIG. 3A.

Referring first to the implementation shown in FIGS. 3A and 3B, called the "intra" embodiment, the encoder compresses the sequence of images from the camera into intra-coded images 303 and inter-coded images 305, as shown in FIG. 3A. The encoding property in this example includes an indication of which image in the sequence is to be compressed into the next intra-coded image, denoted $n_I$, at the time when this indication is sent to the controller. FIG. 3B shows a flowchart of the implementation. In 307, the controller receives an indication of detection of a change of lighting in the camera's field of view. In 309, the controller determines the time until the next intra-coded image $n_I$ will be produced by the camera, such time denoted $t_I$. The controller compares $t_I$ to a pre-defined time threshold T to decide one of the following two actions:

(a) If $t_I < T$, the controller in 311 counts clock units until $n_I$ is the next image to be produced by the camera. In 313, the controller causes adjusting the imaging parameter such that the first additional image produced by the camera after the adjusting is the next image that is to be compressed into an intra-coded image.

(b) If $t_I \geq T$, the controller in 313 causes adjusting the imaging parameter such that the first additional image produced by the camera after the adjusting is the next image that is to be compressed into an intra-coded image.

The threshold T is determined such that the latency from when the change of the lighting occurs to when the camera produces the first additional image with the adjusted one or more imaging parameters is imperceptible. This may be achieved by subjective experiments. A threshold of about 1 second may be used for video conferencing. Other embodiments use a lower threshold for video conferencing, e.g., 0.8 seconds. It should be noted, however, that different thresholds can be used, e.g., depending on the application and use scenarios. The method, apparatus, and computer-readable embodiments, therefore, are not limited to using these particular time threshold values. Of course, the threshold also can be expressed in other than units of time, as would be clear to those skilled in the art.

One specific example of an intra coded embodiment is applicable to the encoder 107 being an H.264 or similar encoder. In such an encoder, there may be intra-coded images that are Instantaneous Decoder Refresh ("IDR") images and Gradual Decoding Refresh ("GDR") images. An IDR image is a single image encoded without prediction from any other images and signals to the decoder the start of a new independent group of images. Images following an IDR image may not refer back to, i.e. be predicted from any one or more images preceding the IDR image. In other words, the decoding process can be restarted at an IDR image regardless of errors occurring prior to the IDR image. This is called intra refreshing. Similar to IDR, GDR also provide intra refreshing for encoding a sequence of images. Unlike an IDR image, which is a single image, Gradual Decoding Refresh spreads the process of intra refreshing over a period consisting of a certain number of consecutive images, called the GDR period. The first image in the GDR period indicates the start of the GDR occurrence. A particular example of an intra embodiment includes the controller 105 receiving information about whether the encoder 107 is producing IDR or GDR images in a periodic fashion, and causing the camera 103 to delay an imaging-parameter-adjustment event to align with the upcoming IDR/GDR occurrence, following the logic flow shown in FIG. 3B.

Figure 4A:
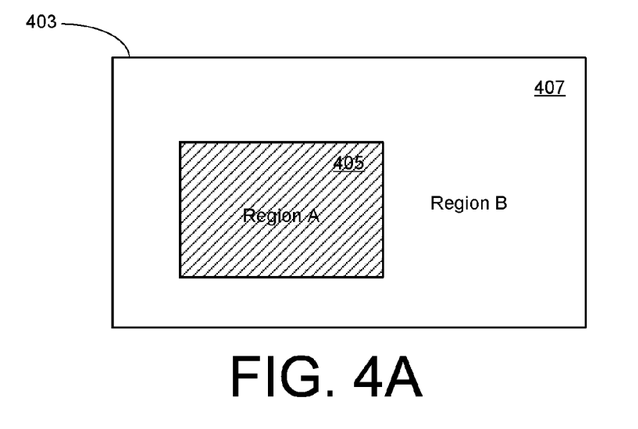
FIG. 4A shows another example encoding property used in another embodiment of a method of controlling adjustment of one or more imaging parameters of a camera.
Figure 4B:
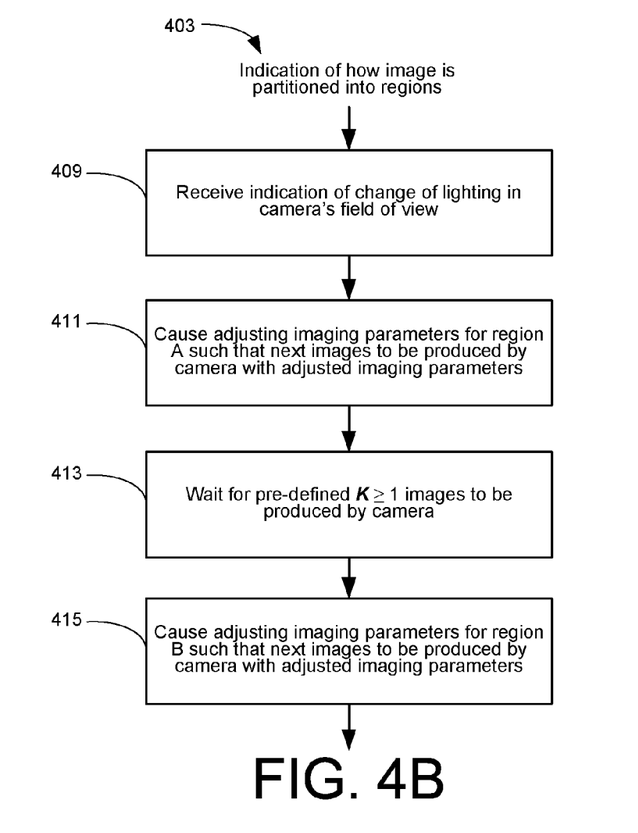
FIG. 4B shows a simplified flowchart of another method embodiment of a method of controlling adjustment of one or more imaging parameters of a camera using the example property shown in FIG. 4A.

FIGS. 4A and 4B illustrate another embodiment called the "partitioning" embodiment herein, according to which an image is partitioned into a set of regions. The encoding property includes an indication of how the image is partitioned. FIG. 4A shows an example image that is partitioned into two example regions, region A 405, and region B 407. The indication of how the image is partitioned is designated 403. An image analyzer element may be included between the output of the camera and the next element, e.g., the encoder to perform the partitioning. In some versions, the image analyzer element is included as part of the encoder. The image analyzer element is configured to partition each image into a set of regions. In one version the partitioning is block-based, while in another version, the partitioning is object-based. In one such example particularly applicable to video conferencing, the image analyzer element is configured to segment each image into a background and into one or more foreground objects, which, in video conferencing, may be human faces. How to segment an image using segmentation techniques is well known to those skilled in the art.

In one partitioning embodiment, the controller 105 determines at least one imaging parameter for one or more of the regions, e.g., for one or more foreground objects and for the background, based on the indication of how the image is partitioned. The controller 105 may cause adjusting of at least one imaging parameter for one or more regions at different times rather than at the same time. For example, the control method of the controller 105 may cause exposure and color balance adjustment on the foreground objects first in one image, and the background separately in the subsequent image. Performing adjustment of one or more imaging parameters based on a meaningful partition of the image at different times allows, for each image, at least a part of the image, e.g., the part representing a stationary background, to be encoded with a relatively small number of bits. This may avoid disruptive increases of the number of bits for encoding one image, or a disruptive degradation of image quality.

FIG. 4B shows a flowchart of one method implementation of the partitioning embodiment wherein the controller receives the indication of the two-region partition shown in the example 403 of FIG. 4A. In 409, the controller receives an indication of a change of lighting in the camera's field of view. Using the indication of the partition 403, the controller 105 in 411 causes adjusting one or more imaging parameters for region A 405. In 413, the controller 105 waits until a pre-defined number, denoted K of additional images are produced by the camera after the adjusting for region A 405, where K≥1. In 415, the controller causes adjusting one or more imaging parameters for region B 407.

It may happen that multiple regions overlap partially or completely. When two regions overlap completely, both the regions may refer to the entire image. In this case, considering the method of the flowchart of FIG. 4B, the controller causes adjusting one or more imaging parameters a first time for the entire image, waits until K additional images are produced by the camera, and then causes adjusting one or more imaging parameters a second time for the entire image.

In one specific example embodiment that includes the encoder 107 performing block-based transforming such as applying the commonly used discrete cosine transform ("DCT") or similar transforms such as those used in the H.264 standard for compression, the partitioning may also include an indication of how one or more regions of the image are divided into transform blocks. In one such embodiment, the controller 105 causes the camera 103 to adjust, e.g., exposure and white balance such that the variation of pixels within each block, e.g., 8×8 block is constant between frames. Constant adjustment per block leads to less high-frequency coefficients to be encoded after the block transform. Video cameras capable of per-pixel exposure adjustment are already known in the marketplace, and may become more common.

Figure 5A:
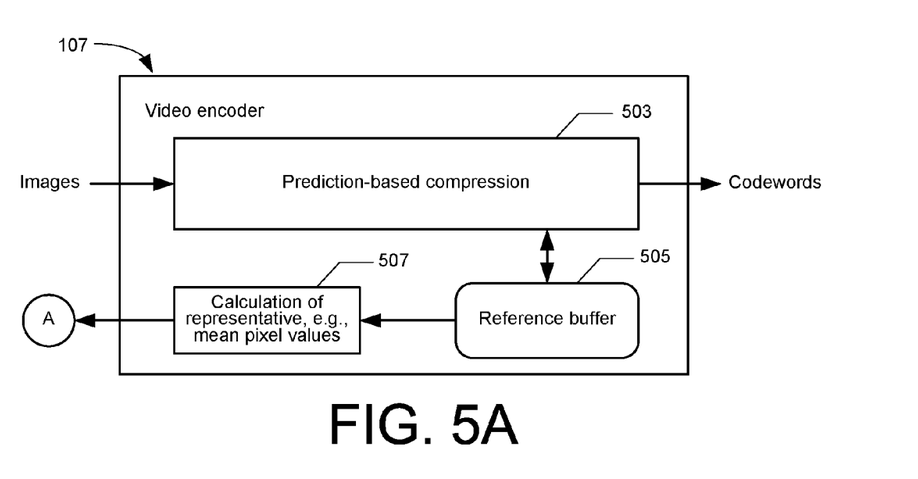
FIG. 5A shows a simplified block diagram of obtaining yet another example encoding property used in yet another embodiment of a method of controlling adjustment of one or more imaging parameters of a camera.
Figure 5B:
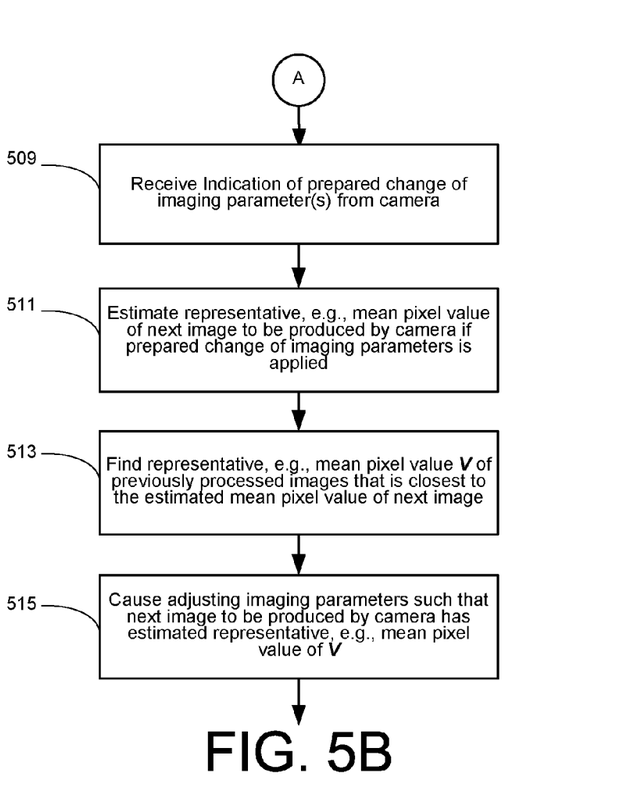
FIG. 5B shows a simplified flowchart of yet another embodiment of a method of controlling adjustment of one or more imaging parameters of a camera using the example property shown in FIG. 5A.

FIGS. 5A and 5B illustrate another method embodiment, called the "reference-image" embodiment herein, wherein, as illustrated in FIG. 5A, the video encoder 107 carries out prediction-based compression 503, and maintains a reference buffer 505 to store previously processed images. The encoder also performs calculation of representative pixel values 507 for each previously processed image stored in the reference buffer 505, such representative pixel values in one embodiment being mean pixel values, and in other embodiments, other measures of representative pixel values, e.g., the median values, or other statistical measures. FIG. 5B shows a flowchart of one version of the reference-image embodiment, in which the controller receives mean pixel values of previously processed images as the encoding property. In 509, the controller receives an indication of a change of one or more imaging parameters from the camera. In 511, the controller estimates the representative pixel value, e.g., mean pixel value of the next image to be produced by the camera, as if the change of one or more imaging parameters is applied. This may be done, for example, by applying the change to pixels in the most recent image and calculating the representative, e.g., mean pixel value of the resulting image. In 513, the controller finds, among the received representative, e.g., mean pixel values of previously processed images, the one that is closest to the estimated representative, e.g., mean pixel value of the next image, denoted V. In 515, the controller causes adjusting one or more imaging parameters of the camera such that the next image to be produced by the camera has an estimated mean pixel value of V.

Thus in one embodiment, the video encoder includes a reference buffer for storing one or more previously processed images, and the one or more encoding properties from the video encoder include one or more representative pixel values, e.g., mean or median values of the one or more previously processed images. Adjusting one or more of the imaging parameters includes selecting one of the one or more previously processed images and reducing the difference of the one or more representative pixel values between the selected previously processed image and an additional image produced by the camera after the adjusting. In one version the method minimizes the difference of the one or more representative pixel values between the selected previously processed image and the next additional image produced by the camera after the adjusting.

One reference-image embodiment is applicable to using an H.264 or similar encoder in which a long-term reference picture ("LTRP") buffer is maintained. An LTRP in H.264 encoding refers to selected previously processed images that are old in the time sequence relative to the most-recently processed images, such recently processed images being considered "short-term" reference pictures. Using data from the encoder's long-term reference memory can be especially helpful in a dynamic environment where lighting changes back and forth. In one such embodiment, the encoding property sent by the encoder 107 and received by the controller 105 includes a representative measure of pixel values of buffered long-term reference pictures, e.g., the average value of the luminance or chrominance levels of each LTRP.

Some modern cameras without the method and apparatus of the present invention include automatic exposure and/or white balance control logic in the camera. Such control logic determines an "optimal" level of average luminance and/or chrominance values based on the changed lighting and prepares for adjusting one or more imaging parameters toward that level.

In one reference-image embodiment in which the camera includes automatic exposure and/or white balance control logic, the controller 105 is configured via a control method to cause the adjustment upon the change of the lighting, and the control method selects a level among the reference pictures that is closest to the desired value, such a desired value being, in one embodiment, the exposure and/or white balance determined by automatic control logic in the camera 103. In another embodiment the control method finds the best trade-off between the desired value and the references. In more detail, the controller 105 evaluates the difference between the conventionally determined level, e.g., the automatic exposure and/or white balance control logic determined values received from the camera 103, and the levels of the buffered long-term reference pictures provided by the encoder 107. The controller 105 selects a level among the references that is closest to the optimal, or, in an alternate embodiment, determines a best trade-off between the conventionally determined exposure or white balance and those of the references. One such trade-off method includes calculating the average of the conventionally determined optimal value and the closest reference level. In one embodiment, the controller 105 decides to use the conventionally determined optimal value of each imaging parameter as the target level for adjustment, but causes the camera 103 to spread the adjustment over more than one image, e.g., over two images. For the first image, the adjustment is carried out based on the reference level that is closest to the conventionally determined optimal, and for the second image, the adjustment is to the conventionally determined optimal level.

In yet another alternate embodiment, the encoder 107 stores an image generated with new one or more imaging parameters into its LTRP buffer after the image is processed, and updates the information provided to the controller 105. The control method refers to the representative measures of the new reference image when making the next decision.

Figure 6:
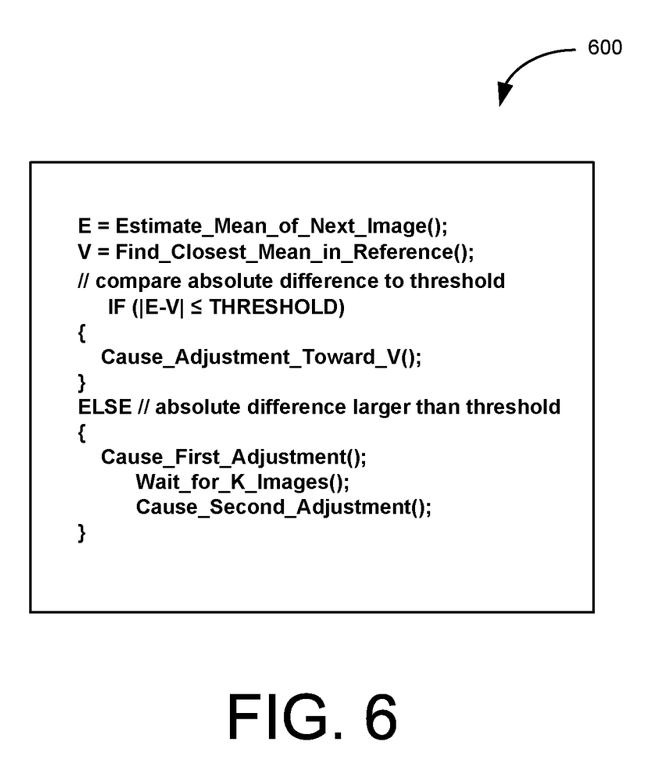
FIG. 6 shows pseudocode for an embodiment of a method that combines features of the embodiment shown in FIGS. 4B and 5B.

The logic of the presented example implementations may be modified or combined to form alternate method, apparatus, and computer-readable medium embodiments. As an example, in one modified reference-image embodiment, the controller evaluates the difference between the found closest representative pixel value of previously processed images and the estimated representative pixel value of the next image, and compares it to a pre-defined settable threshold whose value can readily be determined on the basis of experiments. In one implementation, if the difference is larger than the threshold, the controller decides to adopt the change from the camera, and use the partitioning method embodiment to cause two adjustments incrementally. In a particular implementation, the first adjustment is such that only one or more imaging parameters for a part of the image is performed, or only a lesser degree of the change of one or more imaging parameters is performed on the entire image. The second adjustment is performed after one or more images are produced after the first adjustment, and is such that the change of one or more imaging parameters is applied to the entire image. FIG. 6 shows pseudocode of such a combined embodiment that includes features of the embodiment of FIG. 4B and FIG. 5B.

Those skilled in the art will understand that other modifications and combinations of implementations may be similarly flowcharted or pseudocoded, then implemented. Those skilled in the art will also appreciate that the embodiments described herein are solely for illustration, and that there may be other embodiments including other encoding properties and methods carried out by the controller to cause adjusting one or more imaging parameters of the camera, without leaving the spirit of the invention.

For a CBR video encoder, for example, the encoding property may include the bit-rate budget, i.e., the maximum number of bits that can be spent in encoding the next one or more images. In accordance with the received bit-rate budget, the controller may limit the adjustment of one or more imaging parameters to a lesser degree, when the bit-rate budget is tight, while cause a larger-degree adjustment only when the bit-rate budget permits.

One aspect of some embodiment described herein is an ability to control the amount by which the camera's output sequence of images changes, e.g., due to changes in the scene, e.g., sudden lighting change or other scene change that might, without the control of some of the method, apparatus, and computer-readable embodiments, cause a camera's automatic exposure/white balance adjustment in response to the scene dynamics to in turn cause undesired effects in the encoding of encoder 107. For example, in home video conferencing, lighting and/or scene changes may trigger automatic camera output adjustment that causes difficulty to an encoder. Without the controller 105 causing one or more adjustments of one or more camera parameters according to video encoding properties from the encoder 107 in accordance to one or more features of the present invention, a modern camera that has automatic exposure logic and/or automatic white balance logic, could produce, in response to a scene and/or lighting change, an image that is so different from the previous image or images that it is vastly different from the one or more reference images used for prediction-based encoding ("predictive encoding"). Coding such one or more large differences is costly under a constrained bit-rate budget. Such coding might create, for example, a spike of the number of bits used to encode the frame, or might cause a relatively large degradation of the image quality. The deterioration of image quality may further continue for the following images because the encoder is a predictive encoder. By having the controller 105 take into consideration both the camera and the encoding properties and causing the camera's exposure and/or white balance logic to carry out changes in an "encoder-friendly" fashion, the above situation can be improved.

Figure 7:
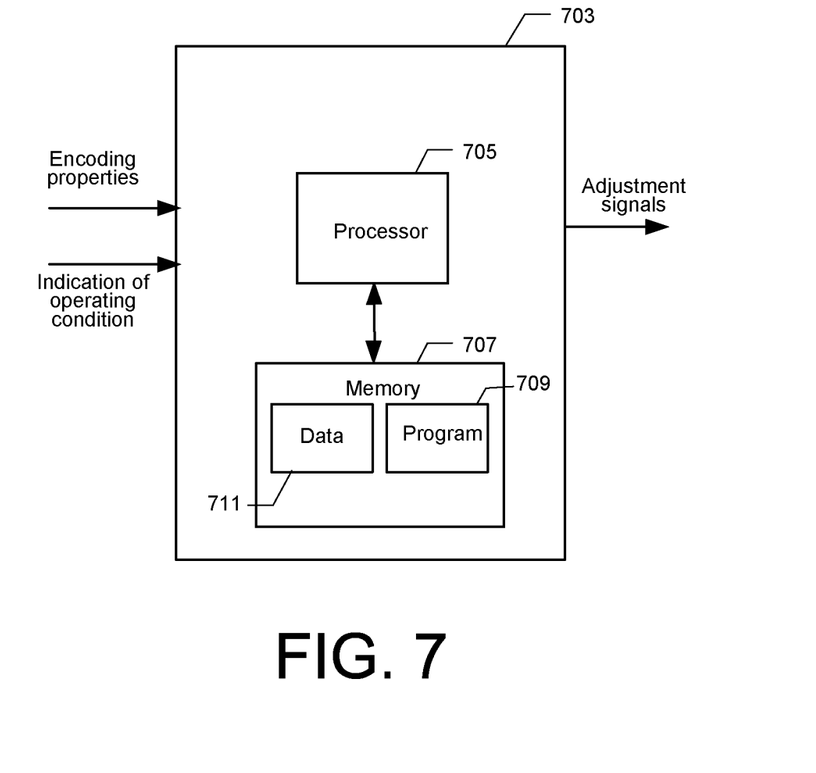
FIG. 7 shows a simplified block diagram of an embodiment of an apparatus that is configured to carry out encoder-supervised imaging, and includes a computer-readable medium that includes instructions that when executed cause carrying out a method as disclosed herein.

FIG. 7 shows a simplified block diagram of an embodiment 703 of an apparatus. The apparatus 703 is operative to carry out encoder-supervised imaging, e.g., by carrying out the method steps of any one of the method embodiments described herein, e.g., a method as described in FIG. 2. Apparatus 703 includes one or more processors 705 and a storage subsystem, e.g., a memory 707. A single processor is shown in FIG. 7 and those skilled in the art will appreciate that this can represent several processors. Similarly, a single storage subsystem is shown as a single memory 707, and those skilled in the art will appreciate that the storage subsystem can include different elements such as RAM, ROM, and so forth. In addition, the storage subsystem may include one or more non-volatile storage elements such as a magnetic or optical storage components. A computer program 709 is included and is stored in the storage subsystem, e.g., loaded into the memory 707. Note that at any time, some of the programs may be in the different parts of the memory subsystem, as will be understood by those skilled in the art. The program 709 includes instructions to instruct the processor to implement, in different versions, the different controlling methods, e.g., as described in FIGS. 3A and 3B, in FIGS. 4A and 4B, and in FIGS. 5A and 5B. In the embodiment shown, the memory subsystem 707 also includes a block 711 for buffering data and storing, for example, pre-defined thresholds.

Unless specifically stated otherwise, as apparent from the following description, it is appreciated that throughout the specification discussions utilizing terms such as "processing," "computing," "calculating," "determining" or the like, may refer to, without limitation, the action and/or processes of an apparatus, or computer, or computing system, or similar electronic computing device, or other hardware that manipulates and/or transforms data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

In some embodiments, a computer-readable storage medium is configured with, e.g., encoded with instructions that when executed by one or more processors of a processing system such as a digital signal processing device or subsystem that includes at least one processor element and a storage subsystem, cause carrying out a method as described herein.

The methodologies described herein are, in some embodiments, performable by one or more processors that accept logic, e.g., instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of: a CPU or similar element; a graphics processing unit ("GPU"); a field-programmable gate array; an application-specific integrated circuit; and a programmable digital signal processor ("DSP") unit. The processing system further includes a storage subsystem with at least one storage medium, which may include memory embedded in a semiconductor device, or a separate memory subsystem including one or more of: main random access memory ("RAM"); static RAM; and read only memory ("ROM"), and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires one or more displays, such one or more displays may be included, e.g., one or more of: a liquid crystal display ("LCD"); an organic light emitting display ("OLED"); and a cathode ray tube ("CRT") display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a video output device, and a network interface device.

The storage subsystem thus includes a non-transitory computer-readable medium that is configured with, e.g., encoded with instructions, e.g., logic, e.g., software that when executed by one or more processors, causes carrying out one or more of the method steps described herein. A non-transitory computer-readable medium includes any tangible computer-readable storage medium. The software may reside in a hard disk, or may also reside, completely or at least partially, within one or both of the RAM and the processor during execution thereof by the computer system. Thus, the memory and the processor also constitute non-transitory computer-readable media on which are encoded instructions.

Furthermore, a non-transitory computer-readable medium may form a computer program product, or be included in a computer program product.

In alternative embodiments, the one or more processors operate as a standalone device or may be connected, e.g., networked to other processor(s), in a networked deployment, and the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer ("PC"), a media playback device, a tablet PC, a set-top box ("STB"), a Personal Digital Assistant ("PDA"), a game machine, a cellular telephone, a Web appliance, a network router, switch or bridge, or any machine capable of executing a set of instructions (sequential or otherwise) that specify actions to be taken by that machine.

Note that while one or more of the diagrams may only show a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment related to each of the methods described herein is in the form of a non-transitory computer-readable medium configured with a set of instructions, e.g., a computer program that when executed on one or more processors, e.g., one or more processors that are part of a video-conferencing apparatus or method, cause carrying out of method steps. Some embodiments are in the form of the logic itself. Thus, as will be appreciated by those skilled in the art, the combinations of features described herein may be embodied as a method, an apparatus such as a special purpose apparatus, an apparatus such as a data processing system, logic, e.g., logic embodied in a computer-readable storage medium, or a non-transitory computer-readable medium that is encoded with instructions, e.g., a computer-readable storage medium configured as a computer program product. The non-transitory computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., in a computer-readable medium, e.g., a computer program on a computer-readable storage medium, or the non-transitory computer-readable medium configured with computer-readable program code, e.g., a computer program product.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions. A non-transitory computer-readable medium may take many forms, including but not limited to non-volatile media and volatile media. Non-volatile media includes, for example, optical, magnetic disks, and magneto-optical disks. Volatile media includes dynamic memory, such as main memory.

It will also be understood that embodiments are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill skilled in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the "DESCRIPTION OF EXAMPLE EMBODIMENTS" section are hereby expressly incorporated into this "DESCRIPTION OF EXAMPLE EMBODIMENTS" section, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It should further be appreciated that although the invention has been described in the context of a transform-based block-based inter-frame coding method such as included in the H.264 coding standard, the invention is not limited to such contexts and may be utilized for use with various block-based encoders and encoding methods, whether standards-based or not, for example in an arrangement that uses MPEG1, MPEG2, H.261, H.263, MPEG4, FLASH by Adobe Systems Inc., and many other encoders and encoding methods. Furthermore, the invention is not limited to any one type of camera architecture and method of acquiring video, and thus may be utilized in conjunction with one or a combination of other architectures and/or protocols.

All U.S. patents, U.S. patent applications, and International (PCT) patent applications designating the United States cited herein are hereby incorporated by reference. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be example inventive embodiments, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
   receiving by a controller one or more encoding properties from a video encoder; and
   causing by the controller of adjusting of at least one imaging parameter of a camera that produces a sequence of images, the causing of the adjusting based on at least one of the received encoding properties, wherein adjusting includes adjusting a color balance parameter,
   such that the camera produces additional images of a sequence of images for the video encoder using the adjusted at least one imaging parameter,
   wherein the video encoder is configured to partition an image into a set of regions, wherein the one or more encoding properties from the video encoder include an indication of how the image is partitioned, and wherein the causing of the adjusting includes determining the imaging parameters for one or more of the regions using the indication of how the image is partitioned, wherein adjusting includes adjusting one or more of the imaging parameters for a first region of the image.

2. A method as recited in claim 1,
   wherein the controller is in the camera or is coupled to an output of the camera,
   wherein the camera has an operating condition that includes, a field of view, lighting, and one or more imaging parameters, including the adjusted at least one imaging parameter, and
   wherein the video encoder is to encode the sequence of images produced by the camera into codewords by performing prediction-based compression.

3. A method as recited in claim 2, further comprising:
   receiving by the controller of an indication of the operating condition of the camera, such that the causing by the controller of the adjusting is also based on the indication of the operating condition.

4. A method as recited in claim 3, wherein receiving an indication of the operating condition includes one or more of:
   detecting or receiving an indication of a change of the lighting in the field of view, and
   receiving an indication of a change of one or more of the imaging parameters from the camera.

5. A method as recited in claim 1, wherein the adjusting includes adjusting an exposure parameter.

6. A method as recited in claim 1, wherein the video encoder is configured to compress the sequence of images into intra-coded images and inter-coded images, wherein the one or more encoding properties from the video encoder include an indication of which image in the sequence is to be compressed into the next intra-coded image, and wherein the causing of the adjusting includes determining a time for the adjusting, such that the first additional image produced by the camera after the adjusting is the next image that is to be compressed into an intra-coded image.

7. A method as recited in claim 1, wherein the adjusting includes:
   adjusting one or more of the imaging parameters for a second region of the image, the second region possibly being the same as the first, after a first number of the additional images are produced following the adjusting for the first region of the image.

8. A method as recited in claim 1, wherein the video encoder includes a reference buffer for storing one or more previously processed images, wherein the one or more encoding properties from the video encoder include one or more representative pixel values of the one or more previously processed images, and wherein the causing of the adjusting includes selecting one of the one or more previously processed images and reducing the difference of the one or more representative pixel values between the selected previously processed image and an additional image produced by the camera after the adjusting.

9. An apparatus comprising:
a controller coupled to a video encoder and configured to control one or more imaging parameters of a camera that produces a sequence of images,
wherein the controller is configured to receive one or more encoding properties from the video encoder, and cause adjusting of at lease one imaging parameter, the causing of the adjusting based on at least one of the received encoding properties, wherein adjusting includes adjusting a color balance parameter,
such that the camera produces additional images for the video encoder using the adjusted one or more imaging parameters,
wherein the video encoder is configured to partition an image into a set of regions, wherein the one or more encoding properties from the video encoder include an indication of how the image is partitioned, and wherein the causing of the adjusting includes determining the imaging parameters for one or more of the regions using the indication of how the image is partitioned, wherein adjusting includes adjusting one or more of the imaging parameters for a first region of the image.

10. An apparatus as recited in claim 9,
wherein the camera includes the video encoder or has an output coupled to the video encoder,
wherein the camera has an operating condition that includes, a field of view, lighting, and one or more imaging parameters, including the adjusted at least one imaging parameter, and
wherein the video encoder is to encode the sequence of images produced by the camera into codewords by performing prediction-based compression.

11. An apparatus as recited in claim 10, wherein the receiving of an indication of the operating condition includes one or more of:
detecting or receiving an indication of a change of the lighting in the field of view, and
receiving an indication of a change of one or more of the imaging parameters from the camera.

12. An apparatus as recited in claim 10,
wherein the controller is further configured to receive an indication of the operating condition of the camera, and
wherein the causing of the adjusting is also based on the indication of the operating condition.

13. An apparatus as recited in claim 9, wherein the adjusting includes adjusting an exposure parameter.

14. An apparatus as recited in claim 9, wherein the video encoder compresses the images into intra-coded and inter-coded images, wherein the one or more encoding properties from the video encoder include an indication of the location in the sequence of the next image that is to be compressed into the next intra-coded image, and wherein the causing of the adjusting by the controller includes determining a time for the adjusting, such that the first additional image produced by the camera after the adjusting is the next image that is to be compressed into an intra-coded image.

15. An apparatus as recited in claim 9, wherein the video encoder includes a reference buffer for storing one or more previously processed images, and wherein the one or more encoding properties from the video encoder include one or more representative pixel values of the one or more previously processed images, and wherein the causing of the adjusting by the controller includes selecting one of the one or more previously processed images and reducing the difference of the one or more representative pixel values between the selected previously processed image and an additional image produced by the camera after the adjusting.

16. A non-transitory computer-readable hardware storage medium storing computer-executable instructions that when executed by one or more processors of a processing system implement a method in a controller, the method comprising:
receiving one or more encoding properties from a video encoder;
causing of adjusting of at least one imaging parameter of a camera that produces a sequence of images, the causing of the adjusting based on at least one of the received encoding properties, wherein adjusting includes adjusting a color balance parameter,
such that the camera produces additional images for the video encoder using the adjusted at least one imaging parameter,
wherein the video encoder is configured to partition an image into a set of regions, wherein the one or more encoding properties from the video encoder include an indication of how the image is partitioned, and wherein the causing of the adjusting includes determining the imaging parameters for one or more of the regions using the indication of how the image is partitioned, wherein adjusting includes adjusting one or more of the imaging parameters for a first region of the image.

17. A non-transitory computer-readable hardware storage medium as recited in claim 16,
wherein the controller is coupled to an output of the camera,
wherein the camera has an operating condition that includes, a field of view, lighting, and one or more imaging parameters, including the adjusted at least one imaging parameter, and
wherein the video encoder is to encode the sequence of images produced by the camera into codewords by performing prediction-based compression.

18. A non-transitory computer-readable hardware storage medium as recited in claim 17, wherein the method further comprises:
receiving an indication of the operating condition of the camera; such that the causing of the adjusting is also based on the indication of the operating condition.

19. A non-transitory computer-readable hardware storage medium as recited in claim 16, wherein the video encoder compresses the images into intra-coded images and inter-coded images, wherein the one or more encoding properties from the video encoder include an indication of the location in the sequence of the next image that is to be compressed into the next intra-coded image, and wherein the causing of the adjusting includes determining a time for the adjusting, such that the first additional image produced by the camera after the adjusting is the next image that is to be compressed into an intra-coded image.

20. A non-transitory computer-readable hardware storage medium as recited in claim 16, wherein the video encoder includes a reference buffer for storing one or more previously processed images, and wherein the one or more encoding properties from the video encoder include one or more representative pixel values of the one or more previously processed images, and wherein the causing of the adjusting includes selecting one of the one or more previously processed images and reducing the difference of the one or more representative pixel values between the selected previously processed image and an additional image produced by the camera after the adjusting.

21. An apparatus comprising:
   a camera to produce a sequence of images and having an output, the camera having an operating condition that includes one or more imaging parameters, a field of view and lighting;
   a controller in or coupled to the camera and configured to control one or more of the imaging parameters; and
   a video encoder coupled to the output of the camera and operative to encode the images from the camera into codewords by performing prediction-based compression,
   wherein the controller is configured to receive one or more encoding properties from the video encoder, and to cause adjusting of the one or more of the imaging parameters based on at least one of the received encoding properties, wherein adjusting includes adjusting a color balance parameter,
   such that the camera produces additional images for the video encoder using the adjusted one or more imaging parameters,
   wherein the video encoder is configured to partition an image into a set of regions, wherein the one or more encoding properties from the video encoder include an indication of how the image is partitioned, and wherein the causing of the adjusting includes determining the imaging parameters for one or more of the regions using the indication of how the image is partitioned, wherein adjusting includes adjusting one or more of the imaging parameters for a first region of the image.

22. An apparatus as recited in claim 21, wherein the video encoder and controller are included in the camera.

* * * * *